(12) United States Patent
Hoves et al.

(10) Patent No.: US 9,765,824 B2
(45) Date of Patent: Sep. 19, 2017

(54) GEAR COUPLING

(71) Applicant: SIEMENS AKTIENGESELLSCHAFT, München (DE)

(72) Inventors: Marc Hoves, Bocholt (DE); Andre Jansen, Borken (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/124,982

(22) PCT Filed: Mar. 5, 2015

(86) PCT No.: PCT/EP2015/054622
§ 371 (c)(1),
(2) Date: Sep. 9, 2016

(87) PCT Pub. No.: WO2015/135832
PCT Pub. Date: Sep. 17, 2015

(65) Prior Publication Data
US 2017/0023067 A1   Jan. 26, 2017

(30) Foreign Application Priority Data
Mar. 12, 2014   (DE) .................. 10 2014 204 590

(51) Int. Cl.
F16D 3/18   (2006.01)
F16D 7/02   (2006.01)

(52) U.S. Cl.
CPC ............... F16D 3/185 (2013.01); F16D 7/02 (2013.01); Y10S 464/90 (2013.01)

(58) Field of Classification Search
CPC ........... F16D 3/185; F16D 7/02; Y10S 464/90
(Continued)

(56) References Cited

U.S. PATENT DOCUMENTS 1,435,141 A * 11/1922 Serrell .................. F16D 3/54
464/900
2,592,309 A * 4/1952 Meier .................... F16D 3/185
464/154
(Continued)

FOREIGN PATENT DOCUMENTS

DE        29918121 U1     2/2000
DE    102005047305 A1     4/2007
(Continued)

OTHER PUBLICATIONS

Siemens-Katalog MD 10.1 "FLENDER Standardkupplungen", ZAPEX-Zahnkupplungen; 2011.

Primary Examiner — Gregory Binda
(74) Attorney, Agent, or Firm — Henry M. Feiereisen LLC

(57) ABSTRACT

A gear coupling for connecting a drive shaft and an output shaft includes a first coupling portion adapted for connection to the drive shaft and a second coupling portion adapted for connection to the output shaft, Each of the first and second coupling portions has a driver toothing with an internal toothing and an external toothing in engagement with the internal toothing. An intermediate tube made of an electrically insulating material connects the first and second coupling portions with one another and electrically insulates the first and second coupling portions from one another. One of the first and second coupling portions surrounds an inner periphery of the intermediate tube and the other one of the first and second coupling portions surrounds an outer periphery of the intermediate tube.

6 Claims, 2 Drawing Sheets

(58) Field of Classification Search
USPC .......................... 464/154, 156, 158, 159, 900
See application file for complete search history.

(56) References Cited

U.S. PATENT DOCUMENTS

| | | | | |
|---|---|---|---|---|
| 2,679,735 | A * | 6/1954 | Rowe | F16D 3/185 |
| | | | | 464/156 X |
| 3,402,572 | A | 9/1968 | Chase et al. | |
| 3,793,849 | A * | 2/1974 | Downey | F16D 3/78 |
| 4,347,715 | A * | 9/1982 | Carman | B21B 33/00 |
| | | | | 464/154 X |
| 6,117,015 | A * | 9/2000 | Ryan | F16D 3/74 |
| 2016/0091029 | A1* | 3/2016 | Jansen | F16D 7/021 |
| 2016/0131195 | A1* | 5/2016 | Jansen | F16D 1/05 |

FOREIGN PATENT DOCUMENTS

| | | | |
|---|---|---|---|
| DE | 102008052760 A1 | | 4/2010 |
| DE | 20 2014 007 550 U1 | * | 10/2014 |
| DE | 202014007550 U1 | | 10/2014 |
| JP | H05240259 A | | 9/1993 |
| WO | WO 2010046003 A1 | | 4/2010 |

* cited by examiner

GEAR COUPLING

CROSS-REFERENCES TO RELATED APPLICATIONS

This application is the U.S. National Stage of International Application No. PCT/EP2015/054622, filed Mar. 5, 2015, which designated the United States and has been published as International Publication No. WO 2015/135832 and which claims the priority of German Patent Application, Serial No. 10 2014 204 590.8, filed Mar. 12, 2014, pursuant to 35 U.S.C. 119(a)-(d).

BACKGROUND OF THE INVENTION

The present invention relates to a gear coupling.

Gear couplings are torsionally stiff couplings, which transmit a torque between two machine shafts by way of interlocked external and internal toothings. The applicant's dual-jointed ZAPEX gear couplings, which are shown in the Siemens catalog MD 10.1 "FLENDER Standard Couplings" 2011, consist of two externally toothed hub parts, which are each fixed to a machine shaft. The external toothing engages in each case into a driving ring, which has a corresponding internal toothing. The driving rings are connected with fitted screws by way of two flanges. The ZAPEX couplings are able to compensate for angular misalignments and parallel and axial offset of the machine shafts.

SUMMARY OF THE INVENTION

The object of the present invention is to specify an improved gear coupling.

This object is achieved in accordance with the invention by a gear coupling for connecting a drive shaft and an output shaft, which gear coupling includes a first coupling portion to be connected to the drive shaft and a second coupling portion to be connected to the output shaft, wherein the two coupling portions each have a driver toothing with an internal toothing and an external toothing which engages therein, and an intermediate tube connecting the two coupling portions with one another and electrically insulating the same from one another made of an electrically insulating material, wherein one of the coupling portions surrounds the inner periphery of the intermediate tube and the other coupling portion surrounds the outer periphery of the intermediate tube.

The gear coupling serves to connect a drive and an output shaft. The gear coupling comprises a first and a second coupling portion. The first coupling portion is to be connected to the drive shaft, whereas the second coupling portion is to be connected to the output shaft. The two coupling portions each have a driver toothing with an internal toothing and an external toothing which engages therein. The gear coupling also comprises an intermediate tube made from an electrically insulating material. The intermediate tube connects the two coupling portions to one another. In addition, the intermediate tube electrically insulates the two coupling portions from one another.

The invention is based on the knowledge that the intermediate tube made of electrically insulating material offers a simple and effective way of providing an electrically insulating gear coupling. Here the intermediate tube is able to transmit higher torques than has previously been possible with conventional insulating components, e.g. threaded sleeves and plain washers made of plastic or rubber, which are used to electrically insulate gear couplings.

Advantageous embodiments and developments of the invention are specified in the dependent claims.

According to a preferred embodiment of the invention, the intermediate tube is made of fiber-reinforced plastic. This may be glass fiber-reinforced plastic (GFK) or carbon fiber-reinforced plastic (CFK). The advantage here is that fiber-reinforced plastic has both a relatively good electrical insulating effect and also a high mechanical stress resistance.

According to the invention one of the coupling portions surrounds the inner periphery of the intermediate tube. In addition, the other coupling portion surrounds the outer periphery of the intermediate tube. The advantage here is that the coupling portion or portions protect(s) the intermediate tube against mechanical damage. For instance, when the gear coupling is used for rail applications, the stone impact that is normal in that scenario is not able to damage the intermediate tube.

According to a preferred embodiment of the invention, at least one of the two coupling portions has a hub which is to be arranged on the drive shaft or output shaft. The advantage here is that the shaft-hub connection permits a space-saving arrangement of the gear coupling.

According to a preferred embodiment of the invention, the at least one coupling portion, which has the driver toothing, has a detachable connection. Here the detachable connection divides the coupling portion into a first part comprising the driver toothing and a second part adjoining the intermediate tube. The advantage here is that the driver toothing can be removed without having to touch the intermediate tube connection.

According to a preferred embodiment of the invention, the first coupling portion is divided into two parts which each have a flange, wherein the flanges are detachably connected to one another by means of screws. The advantage here is that the coupling can be easily separated into several parts, without having to touch the intermediate tube connection.

According to a preferred embodiment of the invention, the first and second coupling portion each have a hub for arrangement on the drive shaft or output shaft and each have a driver toothing. The advantage here is that the shaft-hub connection permits a space-saving arrangement of the gear coupling. The advantage here is also that in this way the coupling can compensate for an angular offset between the drive shaft and output shaft.

According to a preferred embodiment of the invention, at least one of the two coupling portions is connected by way of a slipping clutch to the drive shaft or output shaft. The advantage here is that a torque overload can be prevented.

BRIEF DESCRIPTION OF THE DRAWING

The invention is explained below with the aid of an exemplary embodiment assisted by the appended drawings, in which, shown schematically and not true to scale.

DETAILED DESCRIPTION OF PREFERRED EMBODIMENTS

Figure 1:
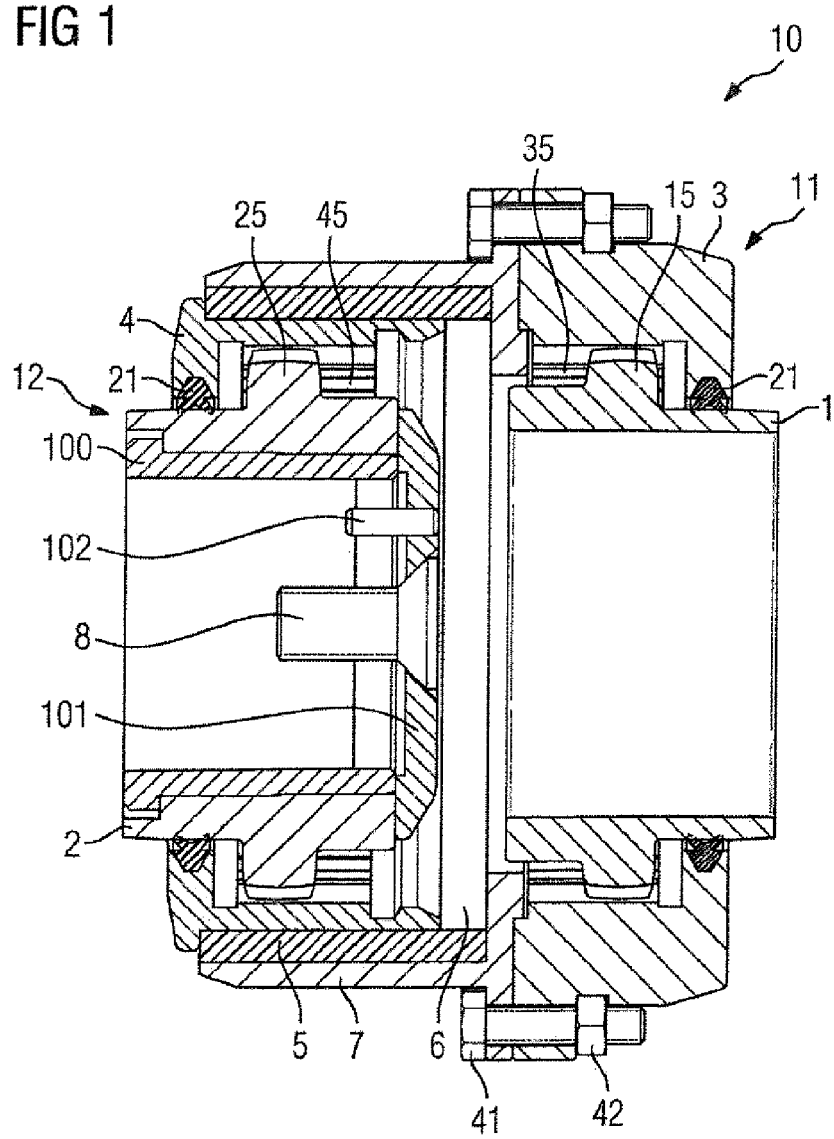
FIG. 1 shows a section of a gear coupling.

FIG. 1 shows a section of a gear coupling 10, which serves to connect a drive shaft and an output shaft (not shown). The drive shaft can be a motor shaft for instance; the output shaft can be a gear shaft for instance. The gear coupling 10 comprises a first, e.g. motor-side, coupling portion 11 for arrangement on a drive shaft and a second, e.g. gear-side, coupling portion 12 for arrangement on an output shaft.

The first coupling portion 11 comprises a first coupling hub 1 for arrangement on a drive shaft. The first coupling hub 1 has an external toothing 15 which extends around the outer periphery of the hub. The first coupling portion 11 also comprises a first driving ring 3 with an internal toothing 35 which extends around the inner periphery of the ring. Here the external and internal toothing 15, 35 of the first coupling portion 11 engage with one another and form a driver toothing which transmits torque.

A flange, which rests on a corresponding flange element 7, is embodied on the end face of the first driving ring 3 which faces the second coupling portion 12. The first driving ring 3 and the flange element 7 have mutually aligned axially parallel boreholes along their outer periphery for receiving screws, into which fitted screws 41 with nuts 42 are inserted. The first driving ring 3 and the flange element 7 are detachably connected to one another in this way.

The flange element 7 has an annular flange, which completely surrounds the exterior of a GFK intermediate tube 5, i.e. a tube made of an electrically insulating material, and covers the motor-side end face of the GFK intermediate tube 5. A second driving ring 4, namely the driving ring 4 of the second coupling portion 12, rests on the interior of the intermediate tube 5. Here the second driving ring 4 covers the interior of the intermediate tube 5 completely, and also covers approximately half of the gear-side end face of the GFK intermediate tube 5. In this way the intermediate tube 5 is covered almost completely and thus protected against external mechanical damage.

Similarly to the first coupling portion 11, the second coupling portion 12 comprises a second coupling hub 2 for arrangement on an output shaft. The second coupling hub 2 has an external toothing 25 which extends around the outer periphery of the hub. The second coupling portion 12 also comprises the second driving ring 4 with an internal toothing 45 which extends around the inner periphery of the ring. Here the external and internal toothing 25, 45 of the second coupling portion 12 engage with one another and form a driver toothing which transmits torque. The second coupling hub 2 rests on a sliding sleeve 100, which in turn is mounted on the conical shaft end of the output shaft, e.g. by means of oil pressure mounting. To axially secure the second coupling hub 2 and the sliding sleeve 100, provision is made for an end disk 101 which can be secured with a screw 8, said end disk being arranged on the shaft end of the output shaft; the end disk 101 acts upon both the second coupling hub 2 and also the sliding sleeve 100 on the end face. In order to prevent a rotation of the end disk 101, a torsion-proof securing pin 102 extending axially is inserted into a borehole in the end disk 101; this pin 102 can be slid into a borehole, which is aligned herewith, in the end face of the output shaft.

On their external end faces, the driving rings 3, 4 each have an annular bulge which projects in the direction of the shaft axis, on the internal periphery of which is arranged a peripheral seal 21. Here the seals each rest on the coupling hubs 1, 2. The seals 21 serve on the one hand to protect the driver toothings from dirt, etc.; on the other hand they retain the lubricant in the driver toothings.

The first 11 and second 12 coupling portion which are generally manufactured from metallic material are connected to one another exclusively by way of the electrically insulating intermediate tube 5, since an air space 6 is disposed between the shaft ends. A passage of current through the gear coupling 10 can be prevented in this way.

The coupling hubs 1, 2 are connected in a torque-proof manner by means of heat shrinking, wedging or in another way to the ends of the two shafts to be coupled to one another; it is possible for instance for the coupling hubs 1, 2 to be fixed on the conical shaft ends with the oil pressure mounting.

The torque is transmitted via the two driver toothings, also known as coupling toothings. The toothing of the driver toothings is embodied to be convex, so that an angular displacement per toothing plane is possible. The radial offset can be compensated across the axial distance of the toothing planes. The internal toothing 35, 45 of the driving rings 3, 4 is embodied to be substantially wider than the external toothing 15, 25 of the hub parts 1, 2. This allows for a comparatively larger permissible axial offset.

Figure 2:
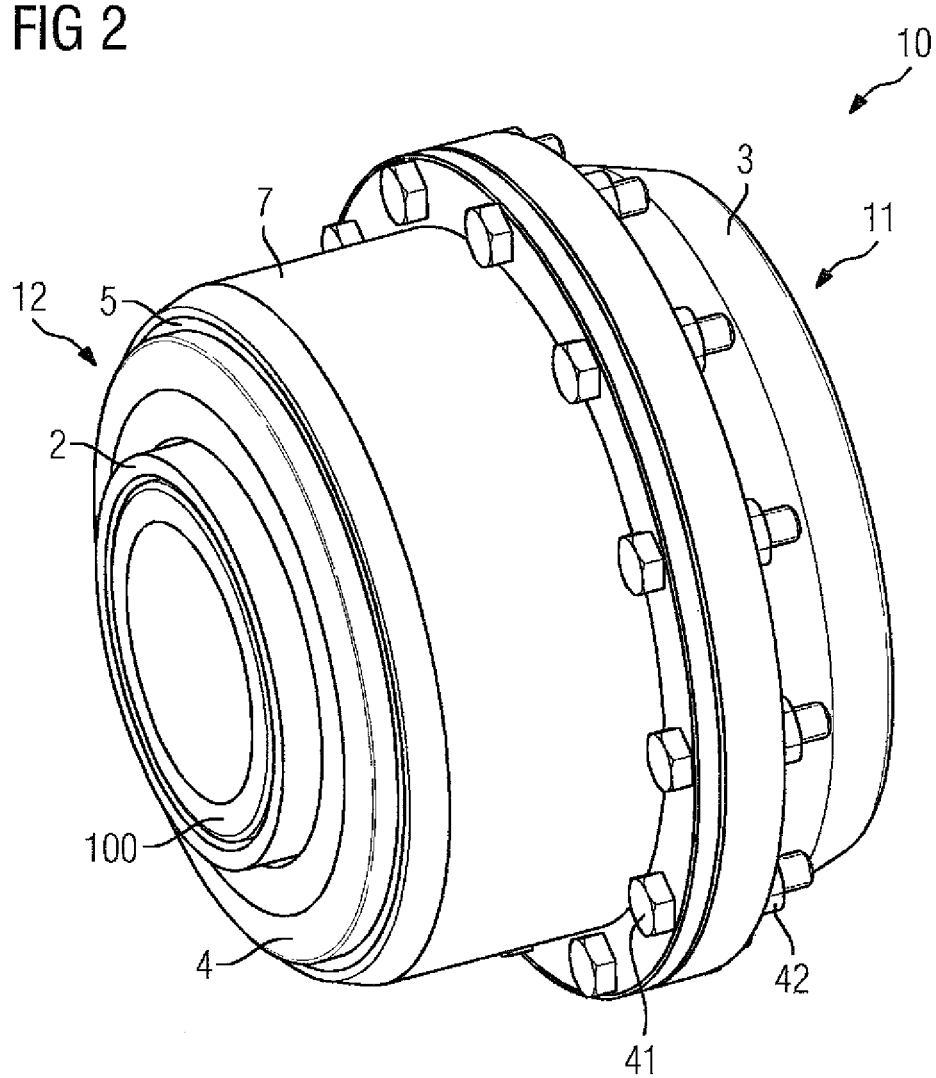
FIG. 2 shows an oblique view of the gear coupling.

FIG. 2 shows an oblique view of the gear coupling 10 shown in FIG. 1. For details about the identifiable components, please refer to the corresponding explanations for FIG. 1.

Although the invention has been illustrated and described in more detail by the exemplary embodiment, the invention is not restricted by the disclosed example.

The invention claimed is:

1. A gear coupling for connecting a drive shaft and an output shaft, said gear coupling comprising:
   a first coupling portion adapted for connection to the drive shaft and having a driver toothing with an internal toothing and an external toothing in engagement with the internal toothing;
   a second coupling portion adapted for connection to the output shaft and having a driver toothing with an internal toothing and an external toothing in engagement with the internal toothing, said first and said second coupling portions being manufactured from a metallic material; and
   an intermediate tube made of an electrically insulating material and configured to connect the first and second coupling portions with one another and to electrically insulate the first and second, coupling portions from one another, one of the first and second coupling portions surrounding an inner periphery of the intermediate tube and the other one of the first and second coupling portions surrounding an outer periphery of the intermediate tube.

2. The gear coupling of claim 1, wherein the intermediate tube is made of fiber-reinforced plastic.

3. The gear coupling of claim 1, wherein at least one of the first and second coupling portions has a hub for arrangement on the drive shaft or output shaft.

4. The gear coupling of claim 1, further comprising a detachable connection configured to divide at least one of the first and second coupling portions in a first part, which comprises the driver toothing, and a second part, which adjoins the intermediate tube.

5. The gear coupling of claim 1, wherein one of the first and second coupling portions is divided into two parts, each said part including a flange, and further comprising a screw fastener configured to detachably connect the flange of one of the parts with the flange of the other one of the parts.

6. The gear coupling of claim 1, wherein each of the first and second coupling portions has a hub for arrangement on the drive shaft and the output shaft, respectively.

* * * * *